(12) United States Patent
Gotovac

(10) Patent No.: US 8,087,629 B2
(45) Date of Patent: Jan. 3, 2012

(54) STAND APPARATUS

(76) Inventor: Lovro Gotovac, Toronto (CA)

(*) Notice: Subject to any disclaimer, the term of this patent is extended or adjusted under 35 U.S.C. 154(b) by 0 days.

(21) Appl. No.: 11/706,282

(22) Filed: Feb. 15, 2007

(65) Prior Publication Data
US 2008/0197247 A1 Aug. 21, 2008

(51) Int. Cl.
A47F 5/00 (2006.01)
(52) U.S. Cl. ............... 248/299.1; 248/126; 248/157; 361/679.01; 361/679.02; 403/3
(58) Field of Classification Search ............ 248/404, 248/405, 406.1, 157, 919, 920, 924, 299.1, 248/298.1, 411, 413, 161, 285.1, 286.1, 276.1, 248/289.11, 186.2, 282.1, 186.1, 125.8, 125.9, 248/131, 145, 415, 425, 349.1, 126, 125.1; 361/681, 682; 403/3, 4
See application file for complete search history.

(56) References Cited

U.S. PATENT DOCUMENTS

| | | | | |
|---|---|---|---|---|
| 407,340 A * | 7/1889 | Faries | ........................ | 248/299.1 |
| 415,065 A * | 11/1889 | Rung | ............................ | 248/413 |
| 1,029,071 A * | 6/1912 | LePage | .................... | 248/231.41 |
| 1,031,839 A * | 7/1912 | Cochran | .................... | 248/299.1 |
| 1,050,321 A * | 1/1913 | Winzenburg | .................. | 359/860 |
| 1,107,811 A * | 8/1914 | Lucas | .......................... | 248/207 |
| 1,278,318 A * | 9/1918 | Edsall | ........................... | 248/515 |
| 1,534,757 A * | 4/1925 | Aprile | ........................... | 33/21.3 |
| 1,547,416 A * | 7/1925 | Edwards | ....................... | 116/173 |
| 1,826,843 A * | 10/1931 | Thomas | ..................... | 248/299.1 |
| 1,965,668 A * | 7/1934 | Ringwald | .................... | 248/645 |
| 2,037,435 A * | 4/1936 | Reichenbach | .............. | 174/70 R |
| 2,057,329 A * | 10/1936 | Duff | .............................. | 403/385 |
| 2,277,253 A * | 3/1942 | Pollinger | ....................... | 211/37 |
| 2,840,332 A * | 6/1958 | Slutzky | ...................... | 248/124.1 |
| 3,211,406 A * | 10/1965 | Averett | ...................... | 248/183.1 |
| 3,650,503 A * | 3/1972 | Seidel | ......................... | 248/285.1 |
| 4,150,297 A * | 4/1979 | Borggren | ...................... | 378/181 |
| 4,209,706 A * | 6/1980 | Nunan | ......................... | 378/189 |
| 4,426,578 A * | 1/1984 | Bradcovich et al. | ..... | 250/363.08 |
| 4,503,331 A * | 3/1985 | Kovacs et al. | ............ | 250/363.04 |
| 4,928,914 A * | 5/1990 | Snodell | ....................... | 248/284.1 |
| 5,014,293 A * | 5/1991 | Boyd et al. | .................... | 378/197 |
| 5,335,142 A * | 8/1994 | Anderson | ................ | 361/679.07 |
| 5,398,903 A | 3/1995 | Cho | | |
| 5,588,625 A | 12/1996 | Beak | | |
| 5,769,369 A | 6/1998 | Meinel | | |
| 5,947,440 A | 9/1999 | Cho | | |
| 6,007,038 A | 12/1999 | Han | | |
| 6,024,335 A | 2/2000 | Min | | |
| 6,032,918 A | 3/2000 | Cho | | |
| 6,050,535 A | 4/2000 | Kang | | |

(Continued)

Primary Examiner — Kimberly Wood

(57) ABSTRACT

The present invention is a stand apparatus for a display screen (such as a computer monitor or a TV) having an arcuate arm member, a base adapted to accept the arm member and allow for tilting movement of the arm member in relation to the base, and a contoured clamp member operable to engage and grip the arm member. The curvature of the clamp member matches the curvature of the arm member and prevents damage to the finish of the arm member. The clamp member is coupled with an arm screw member that is readily accessible to a user. The cross-section of the arm member prevents lateral movement of the arm member in relation to the base. The base is operable to freely swivel 360 degrees and can be readily fixed in relation to a base ring once it is in a desired position. Cabling channels are also provided within the arm member to house cables from the display screen.

2 Claims, 5 Drawing Sheets

U.S. PATENT DOCUMENTS

| | | | |
|---|---|---|---|
| 6,113,264 A * | 9/2000 | Watanabe | 378/197 |
| 6,113,265 A * | 9/2000 | Babler | 378/197 |
| 6,116,560 A | 9/2000 | Kim | |
| 6,227,518 B1 | 5/2001 | Sun | |
| 6,231,021 B1 | 5/2001 | Hong | |
| 6,411,271 B1 * | 6/2002 | Bang et al. | 345/87 |
| 6,510,049 B2 | 1/2003 | Rosen | |
| 6,576,022 B2 * | 6/2003 | Meyer et al. | 623/38 |
| 6,766,994 B2 * | 7/2004 | Serbinski et al. | 248/371 |
| 6,987,666 B2 | 1/2006 | Medica et al. | |
| 7,088,574 B2 | 8/2006 | Greenidge et al. | |
| 2002/0126110 A1 | 9/2002 | Bowron | |
| 2003/0189155 A1 * | 10/2003 | Serbinski et al. | 248/371 |
| 2004/0011938 A1 | 1/2004 | Oddsen, Jr. | |
| 2004/0051012 A1 | 3/2004 | Tsukuda | |
| 2005/0274852 A1 | 12/2005 | Saez et al. | |

* cited by examiner

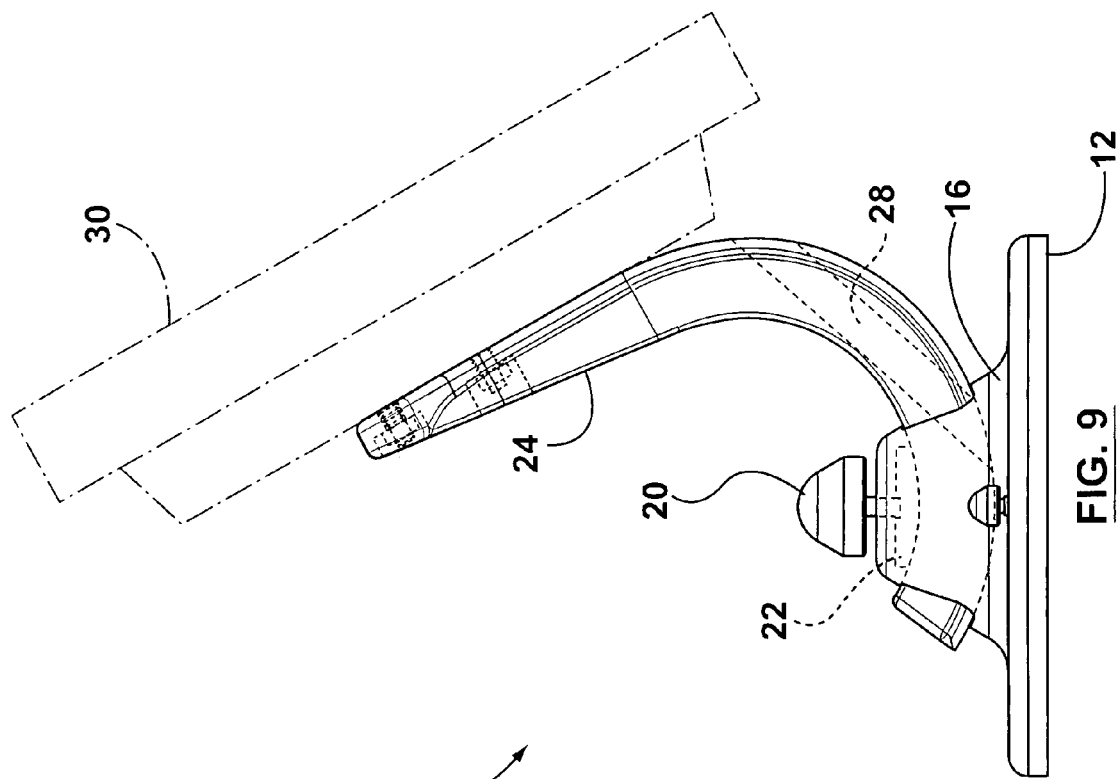
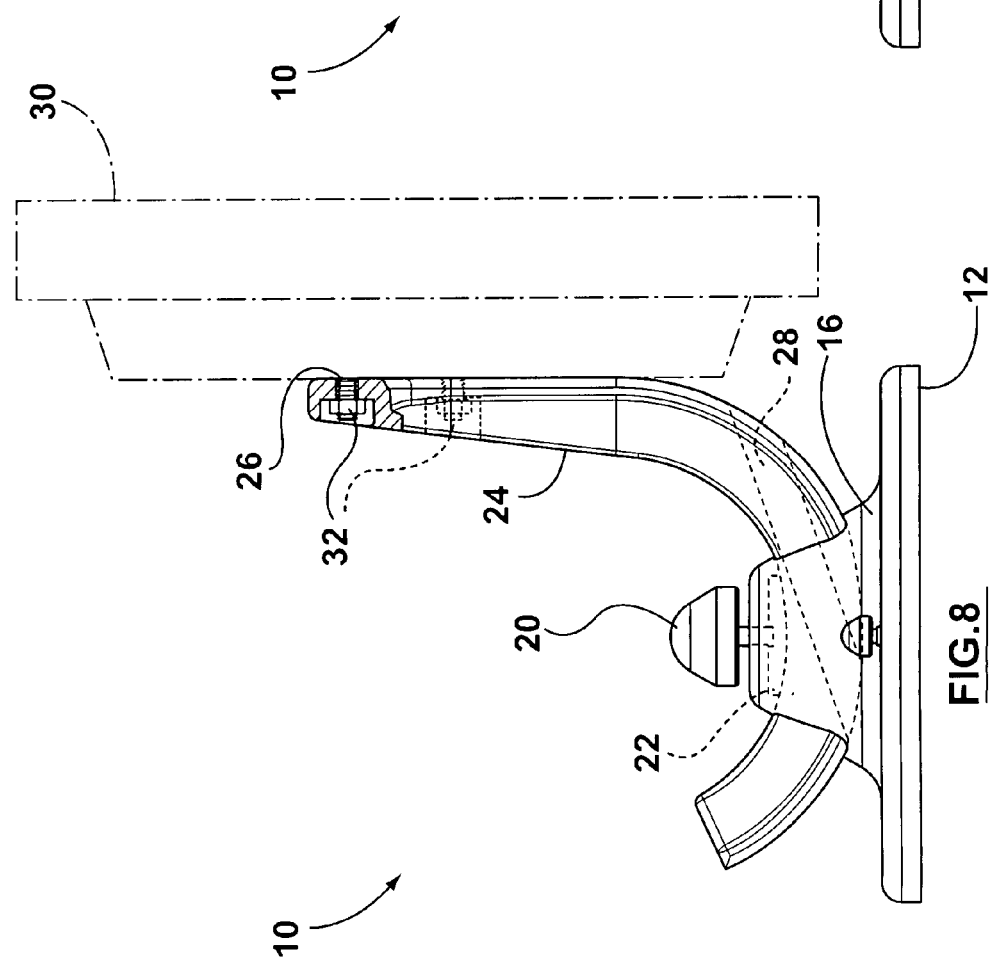

STAND APPARATUS

FIELD OF THE INVENTION

The present invention relates to apparatuses used to mount computer monitors, TV displays, and the like. The present invention relates more particularly to apparatuses used to mount flat screen displays.

BACKGROUND OF THE INVENTION

For computer monitors, TV displays, and the like, it is preferable that the user is able to adjust the monitor, display, etc., in both up and down (or vertically) tilt and right to left (or horizontal swivel direction to allow a given user to fix the monitor in a viewing position that suits them. There has been a multitude of stand apparatus devised and disclosed in this regard.

In particular, stand apparatuses in this field capable of tilting and rotating are well known. For example, U.S. Pat. No. 6,116,560 issued to Kim discloses a monitor stand having a bottom stand unit with a concave socket and a stand display interface with a convex ball portion. This stand is not adapted for a flat screen and it provides a limited range of motion.

U.S. Pat. No. 5,588,625 issued to Beak also provides a monitor stand for a conventional monitor, and includes similar complementary concave portions that provide the tilt mechanism.

Furthermore; U.S. Pat. No. 5,398,903 issued to Cho discloses a video display mounting device in which swivelling and tilting can be adjusted by the user. Unfortunately, this patent also suffers from limited range of motion, and it does not prevent lateral movement, which may be undesirable for the user.

Another tilt and swivel device was disclosed by Han in U.S. Pat. No. 6,007,038. This apparatus includes a tilt member, a swivel member and a base member, and movement is controlled with remote controller. Unfortunately, this device is relatively complex.

Recent improvements in display technology have seen the interest in flat display devices increase as the costs of some of these technologies have come down to an affordable level. In particular, there has been an increasing demand for thin and lightweight screens for TV (including high definition) and outside displays, as well as for high-resolution flat computer monitors that are robust and use little power. Although there are several competing technologies in this market space, liquid crystal displays and plasma displays have emerged as the key players.

The progress in the field of flat screen technology has created the need for further advances in stand technology in both the computing and entertainment context. In general, flat screens have been mounted with a simple flat base or "legs", or, especially in the case of computer monitors, a typical arrangement has involved a single support. Unfortunately, both of these approaches allow for very limited movement, if any, for the user to fix the display into a desired position.

Other solutions have been proposed. For example, U.S. Pat. No. 6,227,518 issued to Sun discloses a pivot base for a flat computer monitor, the base allowing a monitor mounting portion to be tilted forwardly and rearwardly relative to a base member. This base device does not allow for swivelling, comprises two base units, and is only capable of allowing a monitor to pivot about a single axis.

U.S. Pat. No. 5,769,369 issued to Meinel discloses a support device for a flat screen for use in a vehicle, the device comprising a rectangular cradle member, an elongated stand member with ball and socket joint assembly, and a coupling member. This device may not generally be suitable for normal desktop/tabletop use because the ball socket member allows for lateral movement of a monitor, which in the context of computer monitor or tv display (not in a vehicle) is not desirable.

In addition, U.S. Application No. 2004/0011938 filed by Oddsen, Jr., discloses an apparatus for positioning two electronic devices (e.g., flat screen displays) in a plurality of orientations. The apparatus support has a base, a switch arm stand and a pair of ball joint assemblies. The base supports the switch arm stand which in turn pivotably supports the switch arm. This device is directed towards multiple displays and comprises a relatively complicated mounting structure.

In view of the foregoing, what is needed is a stand apparatus for a flat screen that is simple, effective and easy to use, and overcomes the disadvantages and limitations of the prior art.

SUMMARY OF THE INVENTION

In one aspect, the present invention provides a novel stand apparatus for use with a display screen (such as a computer monitor or a TV) comprising: (i) an arm member having a curvature; (ii) a base, the base including an aperture, the aperture adapted to accept the arm member and allow for movement of the arm member in relation to the base along an arc path defined by the curvature; and (iii) a contoured clamp member operable to engage and grip the arm member, wherein the contour of the clamp member corresponds to the curvature of the arm member.

The present invention is advantageous because the clamp member engages the arm member across a relatively broad area because the curvature of the clamp matches the curvature of the arm member. This provides a secure clamping force and minimizes damage to the finish of the arm member and allows for various surface finishing options.

In another aspect, the present invention provides a stand apparatus with an arm screw member coupled with the clamp member, the arm screw member operable to cause the clamp member to engage and grip the arm member. In accordance with one embodiment, the arm screw member is relatively large thereby allowing the user to be able to tactilely identify the arm screw member and tilt the display screen as desired.

In a further aspect, the present invention is advantageous because the base provides for fluid tilting movement by virtue of the fit between the aperture and the cross-section of the arm member. In accordance with this aspect, the cross-section of the arm member can be selected from the group consisting of square, rectangular, trapezoidal, parallelogrammic, quadrilateral, pentagonal, hexagonal or octagonal. In addition to providing aesthetic value, it should be understood that these cross-section shapes substantially prevent any lateral movement of the arm member in relation to the base, and thereby maintaining a consistent attitude or orientation.

In another aspect, the present invention provides a stand apparatus with a base ring that allows the base to freely swivel 360 degrees and a base screw member operable to fix the base ring in relation to the base. The base screw member prevents the display screen from swivelling once it is in a desired position.

In a yet further aspect of the present invention, cabling channels are provided in the arm member such that cables from the monitor or TV display are centrally contained and do not interfere with the tilting/swivelling.

BRIEF DESCRIPTION OF THE DRAWINGS

A detailed description of the preferred embodiments is provided herein below by way of example only and with reference to the following drawings, in which:

FIG. 8 and FIG. 9 illustrate side views of the stand apparatus in two tilt positions.

Figure 1:
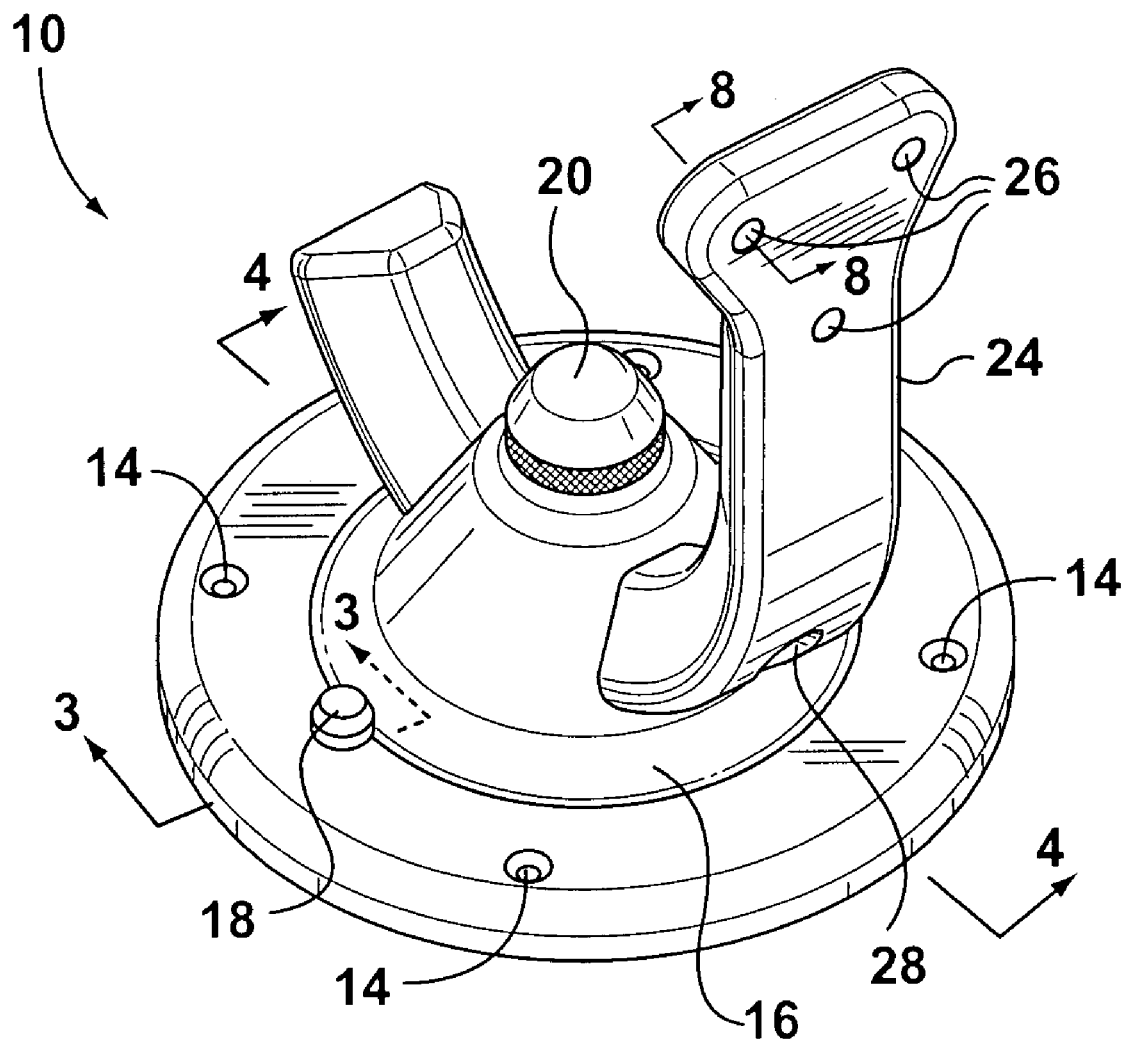
FIG. 1 illustrates a perspective view of the stand apparatus.

In the drawings, one embodiment of the invention is illustrated by way of example. It is to be expressly understood that the description and drawings are only for the purpose of illustration and as an aid to understanding, and are not intended as a definition of the limits of the invention.

DETAILED DESCRIPTION OF THE INVENTION

Figure 2:
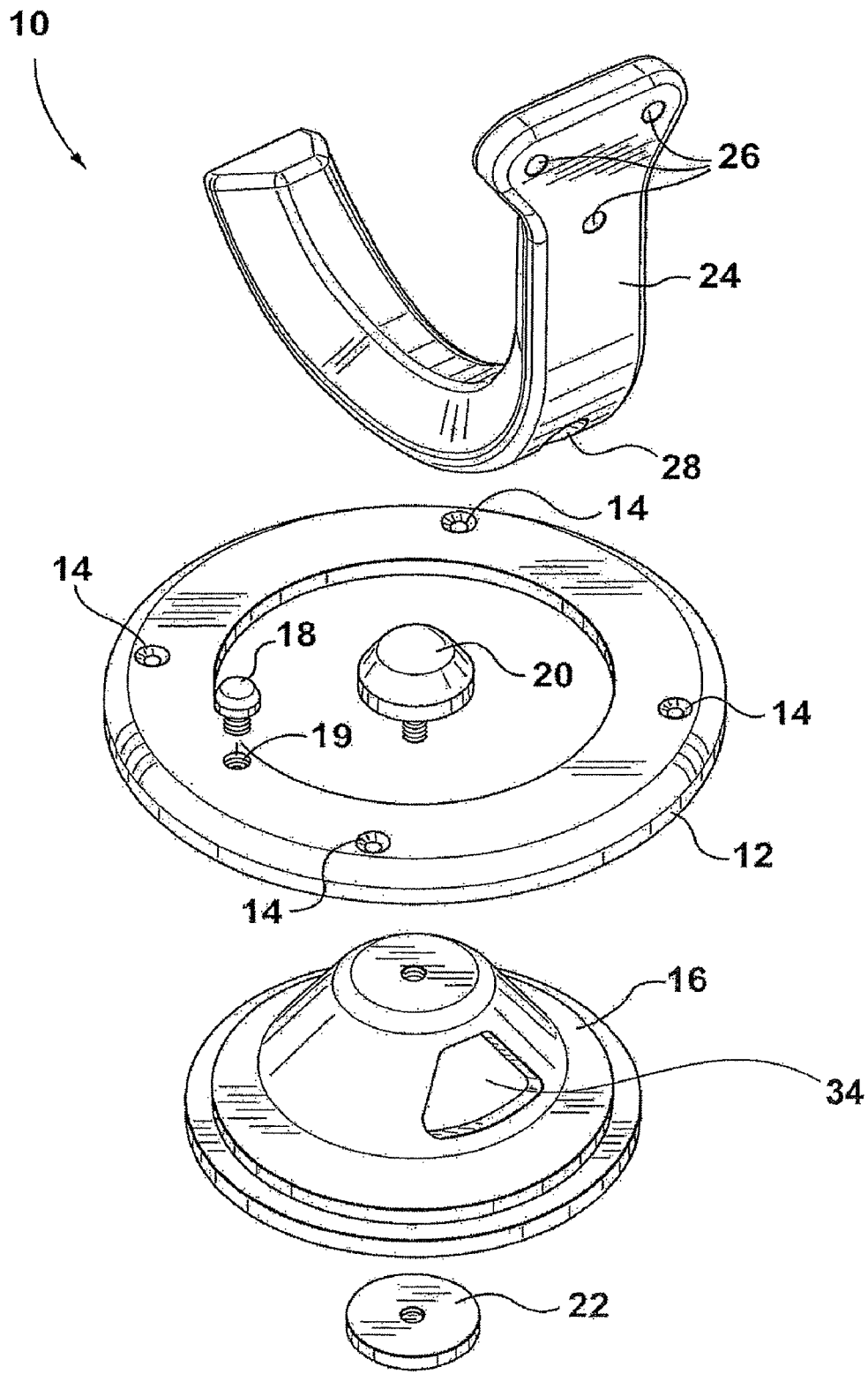
FIG. 2 illustrates an exploded view of the stand apparatus.
Figure 3:
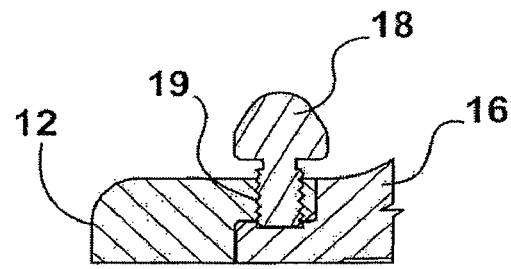
FIG. 3 illustrates a cross-sectional view of a portion of the base of the stand apparatus.

The present invention in accordance with an embodiment thereof is best understood with reference to FIG. 1 and FIG. 2. The stand apparatus 10 comprises a base ring 12 that that is affixable to a surface (not shown) by base ring attachment holes 14 (i.e. using screws or other fastening means. The base ring 12 is fittedly coupled with a round base 16 such that the base 16 is able to freely swivel or rotate within the base ring 12. Bearings may be implemented between the base ring 12 and the base 16 to provide for the swivelling movement. The base 16 and the base ring 12 are fixed in relation to one another by operation of the base screw member 18, such that the base 16 is not rotatable within the base ring 12 when the base screw member 18 having threads 19 is tightened, as shown in FIG. 3 (which illustrates a cross-sectional view of the base ring 12 and the base 16 along axis 3 as defined in FIG. 1).

The base 16 can be conical or hemispheric in shape, for example. The base 16 includes an aperture 34 (as shown clearly in the exploded view provided in FIG. 2). The aperture 34 of the base 16 is operable to fittedly accept an arcuate arm member 24. In particular aperture 34 includes first aperture 34a and second aperture 34b. In other words, the cross-section and the curvature of the arcuate portion of the arm member 24 correspond with the cross-section and the curvature of the aperture 34 of the base 16. The arm member 24 and the aperture 34 of the base 16 are fitted to allow for movement along an arc path defined by the curvature of the arm member 24, i.e. the arm member 24 is operable to freely tilt in relation to the base 16.

Figure 4:
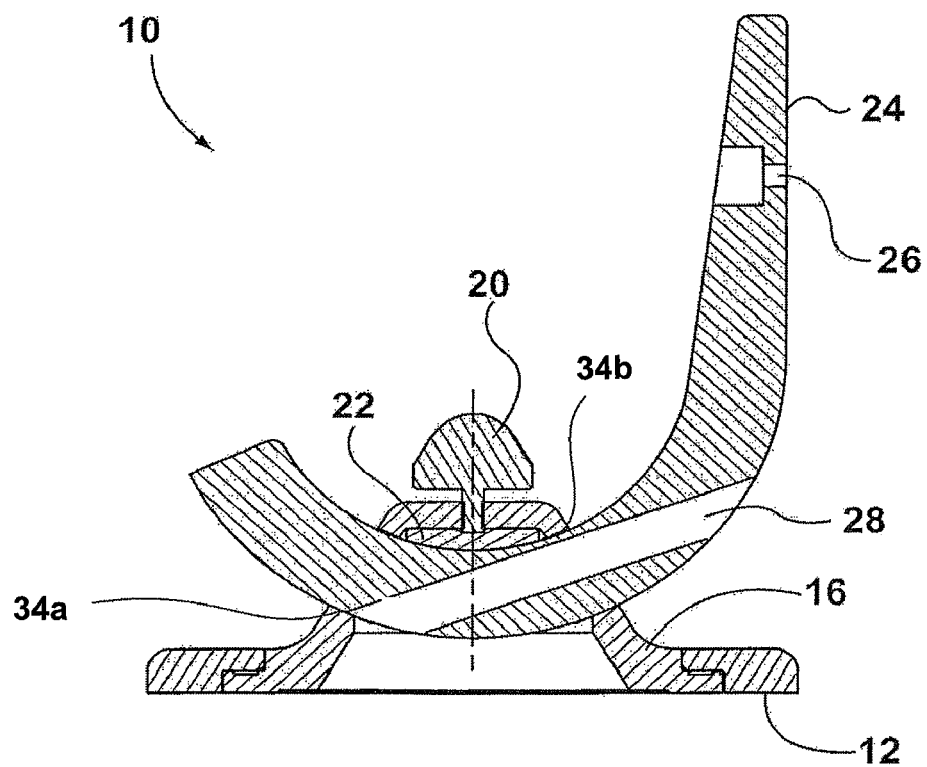
FIG. 4 illustrates a cross-sectional side view of the stand apparatus.
Figure 7:
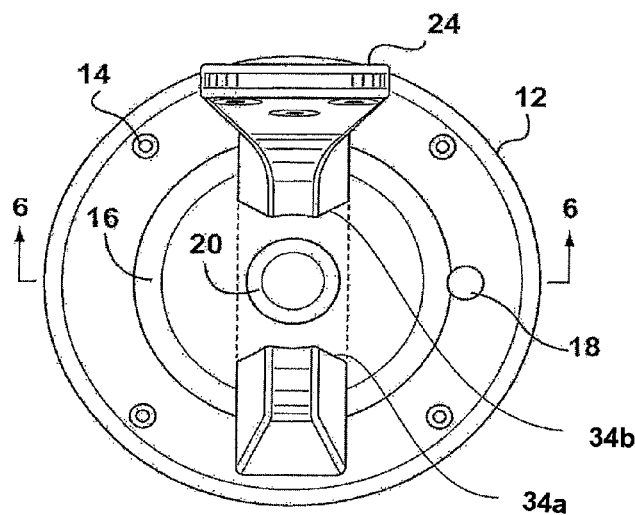
FIG. 7 illustrates a top view of the stand apparatus.

As shown in FIG. 4 (a view along axis 8 as defined in FIG. 1), the arm member 24 may include one or more attachment holes 26 (for attachment to a display screen) and preferably one or more cabling channels 28. The cabling channel 28 provides a conduit for cables running from the screen display to the keep the cables tidy and out of the way, preventing them from obstructing the free movement of the screen display when tilting/swivelling.

An arm screw member 20 is coupled with a contoured clamp member 22 housed within the base 16. In operation, once a user finds a desired tilt angle of the arm member 24, the user can turn the arm screw member 20, thereby causing the clamp member to engage and grip the arm member 24.

Figure 6:
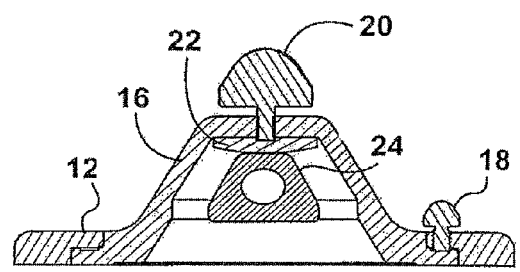
FIG. 6 illustrates a front cross-sectional view of the stand apparatus.

It should be understood that the contour or profile of the surface of the clamp member 22 that engages the arm member 24 substantially matches the curvature of the inside surface of the arcuate portion of the arm member 24 (see FIG. 4). Because of this, the clamp member 22 grips the arm member 24 over a relatively large surface area (see FIG. 4 and FIG. 6), thereby preventing or reducing surface scoring or damage to the arm member 24 that can occur when the clamp member 22 engages the arm member 24. This advantageously allows for more options in the surface finish applied to the arm member 24. For example, the arm member 24 can be anodized or powder coated, in methods that are known.

Although this embodiment features a clamp member 22 that engages with the inside surface (i.e. from above) of the arcuate portion of the arm member 24, the present invention is not limited in this regard. For example, an alternate clamp member could alternatively be applied and engage to the outside surface (i.e. from below) of the arm member 24. In that case, an arm member screw or dial (coupled with the clamp member) could be provided on the side of the base 16 for access by the user.

It should be appreciated that to allow for the free movement and yet proper fit of the arm member 24 through the aperture of the base 16, not only does the cross-section and curvature of the arm member 24 have to correspond to the size and shape of the aperture of the base, but the cross-section of the arm member 24 must be substantially uniform across the arcuate portion of the arm member 24.

Figure 5:
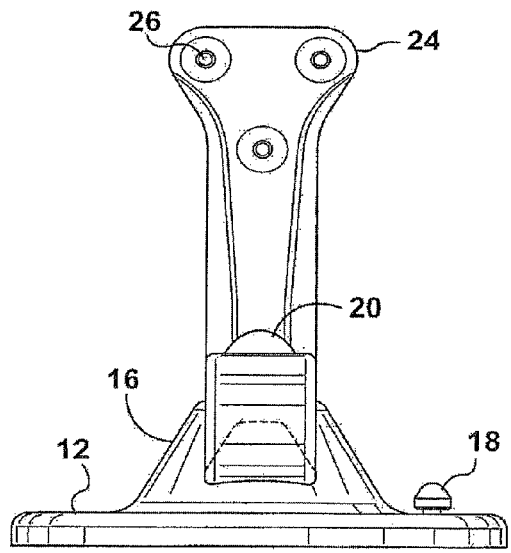
FIG. 5 illustrates a front perspective view of the stand apparatus.

The cross-section of the arcuate portion of the arm member 24 as illustrated in the drawings is generally trapezoidal having slightly rounded corners. Because of the cross-section shape, it should be understood that the stand apparatus 10 is constrained in movement such that the arm member is only tiltable in a single, upright plane (see the forward view provided in FIG. 5). In other words, very little if any lateral movement is possible. Consequently, the display screen is maintained at the correct attitude or orientation for the user to view the display screen.

Although the cross-section of the arm member 24 is illustrated as being generally trapezoidal (see for instance FIG. 6), it should be understood that other cross-sections are compatible with the present invention, including square, rectangular, parallelogrammic, quadrilateral, pentagonal, hexagonal or octagonal.

FIG. 8 and FIG. 9 show the stand apparatus 10 used in conjunction with a display screen 30. The display screen 30 is affixed to the stand apparatus 10 by attachment screws 32 and the attachment holes 26. FIG. 8 and FIG. 9 show two different tilt angles achievable by the stand apparatus 10.

As shown in FIG. 8 and FIG. 9, the arm member 24 comprises an arcuate portion and a longitudinal portion. The overall dimensions of the stand apparatus 10 depend on the proportional size of the arcuate and longitudinal portions, the dimensions of the display screen 30, the dimensions of the base, and the desired height of the display screen 30, among other things, as would be appreciated by a person of skill in the art. It should be understood that although this embodiment features an arcuate arm member 24 having both an arcuate portion and a longitudinal portion, the longitudinal portion is not essential to the present invention. In other words, the arm member 24 can be arcuate in its entirety.

One of the advantages of the present invention is the wide range of motion provided by the stand apparatus 10. In fact, there are limitless orientations available given that the base is operable to swivel 360 degrees and the arm member is operable to tilt (the range of angles that can be achieved by tilting the arm member 24 depend on the particular dimensions of the stand apparatus 10).

The stand apparatus 10 is also simple to use, since the orientation of the display screen 30 is governed by two handle knobs that are easy to locate and control. The arm screw member 20 is relatively large, allowing a user to reach behind the display screen 30 and tactilely identify the arm screw member 20. As well, the base screw member 18 is easy to identify and easy to reach, allowing the user to adjust the base 16 to swivel in order to orient the display screen 30 in a desired location.

It will be appreciated by those skilled in the art that other variations of the preferred embodiment may also be practiced without departing from the scope of the invention.

What is claimed is:

1. A stand apparatus comprising:
    (a) a base ring;
    (b) a base, rotatable within the base ring about an axis of rotation
    (c) an arm member, the arm member having a curved portion with an upper surface and a lower surface, where the lower surface is wider than the upper surface;
    (d) the base including an aperture, the aperture slideably receiving the arm member along an arc path defined by the curved portion;
    (e) means carried by said base ring for releasably fixing said base relative said base ring;
    (f) a contoured clamp member operable to engage and grip the arm member, wherein the contour of the clamp member corresponds to the upper surface of the curved portion of the arm member and wherein the base is hollow and generally conical or hemispheric in shape, and said arm member includes a hole through said curved portion defining a linear path.

2. A swivel stand apparatus for a display screen comprising:
    (a) a base ring
    (b) an arm member, the arm member having an arcuate portion and a substantially straight portion, wherein the substantially straight portion of the arm member includes means for attaching the arm member to the display screen, the arcuate portion having an upper surface and lower surface that is larger than the upper surface;
    (c) a hollow base rotatable with in the base ring about an axis of rotation;
    (d) the base having a first and second aperture to slidingly receive the arcuate portion of the arm member such that the longitudinal portion of the arm member is tiltable in relation to the base;
    (e) a clamp disposed about said axis of rotation to engage and grip the arcuate portion of the arm member;
    (f) fastening means carried by said base ring to releasably fasten the base relative the base ring in a selected rotational position wherein the arm member includes one or more cabling channels defining a linear path opening between said inside and outside surfaces in said arcuate portion.

\* \* \* \* \*